United States Patent [19]

Fabian

[11] Patent Number: 5,195,122
[45] Date of Patent: Mar. 16, 1993

[54] MARKER FOR EXPOSURE SIDE OF MEDICAL RADIOGRAPH INCLUDED WITH PATIENT IDENTIFICATION DATA

[76] Inventor: Carl E. Fabian, 577 NE. 96th St., Miami Shores, Dade County, Fla. 33138

[21] Appl. No.: 825,530

[22] Filed: Jan. 24, 1992

Related U.S. Application Data

[63] Continuation-in-part of Ser. No. 655,804, Feb. 13, 1991, abandoned.

[51] Int. Cl.⁵ .............................................. H05G 1/28
[52] U.S. Cl. .................................. 378/165; 378/166; 378/163
[58] Field of Search ................ 378/165, 166, 163, 162

[56] References Cited

U.S. PATENT DOCUMENTS

| | | | |
|---|---|---|---|
| 3,518,428 | 6/1970 | Ring | 378/165 |
| 3,668,394 | 6/1972 | Panzer | 378/165 |
| 4,035,653 | 7/1977 | Karasko | 378/165 |
| 4,127,774 | 11/1978 | Gillen | 378/165 |
| 5,034,974 | 7/1991 | Yorosko | 378/166 |

Primary Examiner—Constantine Hannaher
Assistant Examiner—Don Wong
Attorney, Agent, or Firm—Ernest D. Buff

[57] ABSTRACT

A chirally asymmetric marking on a sheet of radiographic film, positively identifies the side of the film sheet facing the front of an x-ray cassette during radiographic exposure. The marking is permanent and is accomplished automatically in an inexpensive, convenient and highly reliable manner.

17 Claims, 7 Drawing Sheets

MARKER FOR EXPOSURE SIDE OF MEDICAL RADIOGRAPH INCLUDED WITH PATIENT IDENTIFICATION DATA

CROSS-REFERENCE TO RELATED APPLICATIONS

This Application is a Continuation-In-Part of copending U.S. application Ser. No. 655,804 filed Feb. 13, 1991, now abandoned.

BACKGROUND OF THE INVENTION

1. Field of the Invention

The present invention relates to the field of medical radiography, and more particularly to means for positively identifying the exposure side or front side of an x-ray film.

2. Description of the Prior Art

A medical radiograph is the x-ray image of some part of the body produced by an x-ray beam originating from an x-ray tube, passing through the body part, and then striking an x-ray film. During exposure the x-ray film is typically contained within a cassette which is a light-proof, flat box of rigid construction.

X-ray film, like photographic film, is generally comprised of a sheet of translucent supporting material called the base which is coated on one or both sides with a photosensitive emulsion. This photosensitive emulsion can be activated (or sensitized) by exposure to photons of different wavelengths within the electromagnetic spectrum, including the visible light band and the x-ray band. The sensitivity of the film emulsion to photons varies with the wavelength of the photons and is generally far more sensitive to photons in the visible band of the spectrum than in the x-ray band of the spectrum. Activation produces a latent effect on the emulsion which, when the film is developed, appears as a relative darkening of the emulsion proportional to the amount of exposure. A part of the body interposed between the x-ray beam and the film absorbs the x-ray beam in variable degrees depending on the internal structure of the part x-rayed. This differential exposure of the film results in a pattern of light and dark corresponding to the anatomy of the part x-rayed and constitutes the medical radiograph.

Since it is generally desirable that the medical radiograph be provided with pertinent identifying information such as the patient's name, date, etc., means must be provided to transmit such data to the film. This is accomplished in various ways. The technologist can simply write this information directly on the film surface or attach a label containing such data, usually after the film is processed. However this lends itself to possible error, particularly in larger departments, and has generally been superseded by methods of identification carried out at the time of exposure or before processing. The prior art describes several methods whereby the identification is carried out by radiographic means (see U.S. Pat. No. 3,518,428 to Ring; U.S. Pat. No. 4,035,653 to Karasko; U.S. Pat. No. 3,668,394 to Panzer; and U.S. Pat. No. 4,127,774 to Gillen). All of these describe means by which the desired information is fashioned into radiopaque indicia which is positioned on the front surface of the x-ray cassette whereby it intercepts and absorbs a portion of the x-ray beam used to produce the anatomic image. This data is transmitted simultaneously with the anatomic information creating the radiographic image through the cover of the closed cassette and causes an image of the data to appear on the enclosed film along with the image of the body part x-rayed. Thus a single radiographic exposure creates both the medical radiograph and image of the identification data on the film.

Film identification systems wherein patient data is conveyed to x-ray film by visible and near visible light, that is light having wavelengths ranging from $1 \times 10^{-7}$ meters to $1 \times 10^{-6}$ meters, are referred to as "photographic" systems. Such photographic systems differ from "radiographic" systems, wherein data is conveyed to the film by x-ray radiation, in that photographically conveyed data can be more quickly and easily generated than data conveyed by x-ray radiation. As a consequence, virtually all cassettes in use today use photographic means, and not radiographic means, to provide x-ray film with patient data. X-ray cassettes, appointed for use in photographic film identification systems, are provided with a "blocker". This blocker is generally comprised of one or two rectangular strips of lead mounted on the cassette that shield a preselected area of film between the two blockers from becoming exposed by the effect of the x-ray beam. Prior to development of the sheet of film, patient identification data contained on a card or piece of paper is projected by a beam of light onto the area of the film shielded from x-ray exposure by the blocker. A latent image of the data is formed within the rectangular area of film shielded by the blockers, and becomes visible when the film is developed. This identification rectangle is about 3 square inches. The position of the blocker within the cassette is not necessarily consistent, even within the same x-ray department, and may vary with the manufacturer, cassette type, or type of film identification system used. The exact manner in which the data is projected onto the film varies with the type of identification device employed.

Generally a beam of light is used to convey the data from the card containing it to the area of the undeveloped film appointed to receive such data. Thereby an image of the data is created that becomes visible when the film is developed. Device and methods, including modifications of the film cassette for marking exposed film or radiographs with patient data are disclosed, for example by U.S. Pat. Nos. 3,628,864, 3,703,272, 4,465,364, 4,510,392, 4,806,959, 4,383,329, 4,520,497, and 4,768,114.

When rendering a diagnosis from a radiograph it is necessary for the film viewer to know which side of the body is being viewed. Since the body is generally symmetrical, right-sided structures are similar in appearance to left-side structures except that they are mirror images or reversals of one another. For example, an x-ray image of a left foot if viewed from the back of the exposed film will look like a right foot. Since radiographs are typically transparent and can be viewed from either side, it is therefore possible for x-ray images of one side of the body to become confused with the other. For this reason when a medical radiograph is performed of some part of the body it is customary for the technologist to affix a lead "R" or "L" marker on the cassette surface adjacent to the part being x-rayed. This indicates which side of the body is represented on the film. Not infrequently however, the technologist places the wrong lead marker on the cassette or for one reason or another its image is not visible on the film, being either obscured or omitted. When this happens, the technologist then needs to mark the film after it is developed, using an adhesive label, wax pencil, ink, or other means. The incidence of incorrect or absent right-/left marking due to human error is quite substantial, reportedly as high as 30%. If the film is improperly marked and the physician interpreting the film recognizes the error he will often try to locate the technologist who performed the study to obtain clarification. When the question cannot be resolved in this manner, the patient may be recalled for a repeat examination that involves time, inconvenience, expense and additional radiation exposure. Furthermore, if the error should go undetected, incorrect medical treatment may result.

Various film identification systems exist to provide means for the patient data to be included on the radiograph. In one such system, patient data is entered on a card that, in the dark room, is placed into the device to thereby approximate the surface of an undeveloped x-ray film sheet. The card is then transilluminated by a light beam that passes through the card, thereby projecting the image of the patient data onto the identification rectangle of film in the manner of a contact print. Depending on the particular type of device used or the manner in which the card is inserted, the image of the patient date may be presented on the developed film reading in either a forward or reversed orientation. If the card is inadvertently inserted with the wrong face up, the image of the patient data is presented on the developed film in reversed orientation.

Another type of film identification device, disclosed by U.S. Pat. No. #3,628,864 to Fessenden et al., illuminates the face of a card by a light source and optically projects patient data from the card face onto the film identification rectangle by means of lens system. Such a system is marketed by KODAK under the name "X-OMATIC IDENTIFICATION CAMERA". The patient data card is placed face-down over an aperture in a camera. When the undeveloped x-ray film is ready for identification, the cassette in which the film is contained, is placed face-down onto a cassette receiver and firmly pressed against a switch, which causes a sliding panel in the back of the cassette to open, uncovering the film identification rectangle. A lens system optically projects data from the card onto the back of the film.

Still another type of identification device, is disclosed by U.S. Pat. No. #4,383,329 to Kröbel et al. By means of an internal lens system, the device of Kröbel et al., optically projects patient identification data from a card placed over an aperture in the device onto the identification rectangle of the undeveloped film. The Kröbel et al., device also contains means for (1) reversing the orientation of the identification data, at the option of the operator, and (2) electronically generating and projecting additional data onto the film.

It is not possible to reliably identify the exposure side of an x-ray film from the direction the patient identification data reads or from the position of the identification blocker. For example, certain commercial film identification devices project patient identification data into the identification rectangle in an orientation which is readable from the exposure side of the film whereas other commercial film identification devices project the data in an orientation which is backwards when seen from the exposure side of the film. Furthermore it is possible for the card containing the data to be inserted upside down in some of such devices, altering the side of the film that the patient data can be read.

There remains a need in the art for a method and means operative to locate within the film identification area a marker that expressly and reliably indicates the exposure side of the film independent of the actions of the technologist and independent of the orientation of the patient identification area.

SUMMARY OF THE INVENTION

In accordance with the present invention, right/left confusion heretofore encountered in viewing radiographs is virtually eliminated. The primary cause of such confusion stems from the fact that the x-ray film is transparent and may be viewed from either the front (exposure side) or the back. As a result, the image of a left foot viewed from the back of an x-ray film appears to be that of a right foot.

The present invention provides an x-ray film marker disposed on an x-ray film for positively identifying the front or exposure side of an x-ray film, and an apparatus and method for marking the film. Generally stated, the invention provides a chirally asymmetric marker disposed on a sheet of radiographic film. The marker indicates the side of the sheet of radiographic film facing the front of an x-ray cassette during radiographic exposure. Preferably, the marker appears within the identification rectangle of the sheet of radiographic film.

Further, the invention provides an apparatus for projecting a chirally asymmetric marker onto an undeveloped sheet of radiographic film, comprising: a light source for emitting light having a wavelength that ranges from $1 \times 10^{-7}$ meters to $1 \times 10^{-6}$ meters; a recess for receiving the sheet of radiographic film; and means for positioning a chirally asymmetric symbol in the light path from the light source to the sheet of radiographic film. Thus positioned the symbol is projected onto the film sheet to form thereon a marker that becomes permanently recorded upon development of the film.

This invention provides apparatus for marking the front or exposure side of an x-ray film. The marking is permanent and is accomplished automatically in an inexpensive, convenient, and highly reliable manner. No change in the normal procedure of the x-ray technologist is required. Marking of the film front is unaffected by the orientation of other projected data, such as patient identification data. The indicia on the film's exposure side assures that the side of the body part represented thereon is accurately discerned. Location of the marking is independent of actions taken by the technologist, making it far more reliable and accurate than extant systems for affixing lead markers. Once located, the marker remains visible on copies of the radiograph. Diagnosis is more accurate and the number of repeat examinations is reduced. Patients encounter less radiation exposure and fewer treatment errors, and the quality of medical care is improved.

BRIEF DESCRIPTION OF THE DRAWINGS

The invention will be more fully understood and further advantages will become apparent when reference is had to the following detailed description of the preferred embodiment of the invention and the accompanying drawings, in which.

DESCRIPTION OF PREFERRED EMBODIMENTS

A marker placed on the film, which reliably indicates the front side of the film for the viewer, prevents the inadvertent viewing of the film from the wrong side and thereby permits an accurate assessment of the side of the body that is represented thereon. The marker preferably comprises a character, letter, or word having chiral asymmetry. A chirally asymmetric marker is one whose mirror image appears backwards and is therefore different and distinguishable from the marker itself. A chirally asymmetric marker that is oriented to read forwards from the front of a transparent surface will also read backwards if viewed from the back side of the surface. Such a marker provides the means to distinguish the front surface of a film from the back. For example, both the letter "F" and the word "Front" are chirally asymmetric and either one, seen from the back, would be readily identifiable as being backwards, whereas a word such as "MOM" or letters such as "T, X, I, or V" would read the same from the back as from the front and therefore be chirally symmetric. Preferably the marker, in addition to being chirally asymmetric, also designates the front of the film in an explicit manner such as "F", "FILM FRONT", "FRONT", "EXPOSURE SIDE". However other chirally asymmetric symbols could be used for this purpose.

Figure 1:
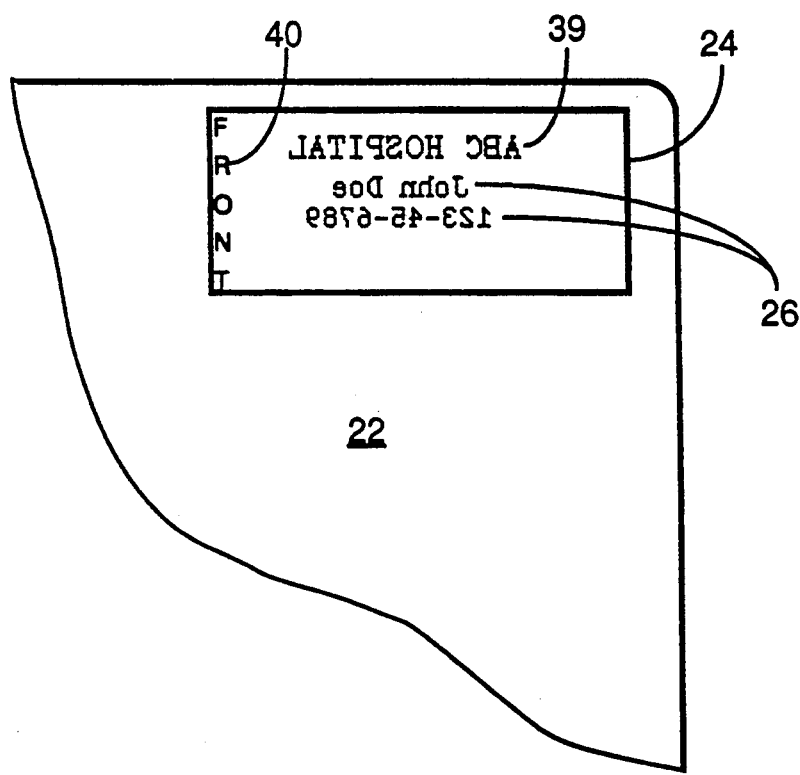
FIG. 1 is a schematic representation of a developed radiograph, partly cut away to show a corner thereof, including a film identification rectangle containing patient identification data and a chirally asymmetric marker.

As shown in FIG. 1 marker 40, which is chirally asymmetric and placed within film identification rectangle 24 containing patient identification data 26 and optionally facility data 39, provides reliable means for identifying the front or exposure side of developed film sheet 22. Marker 40 appears along one margin of the rectangle 24, occupying a portion of the rectangular area, while the patient identification data 26, in this example shown in reverse orientation, appears in the remainder of the area. Turning the film containing the marker so that the marker appears upside-down or along either side will not alter the direction in which the marker reads correctly, as long as the same surface of the film remains toward the viewer. Marker 40 appearing on film 22 is specifically generated to always read in a forward orientation from only the front side of film 22, thereby making the front side readily identifiable to the viewer, whereas patient identification data may variably read in either forward or backward orientation.

Figure 2:
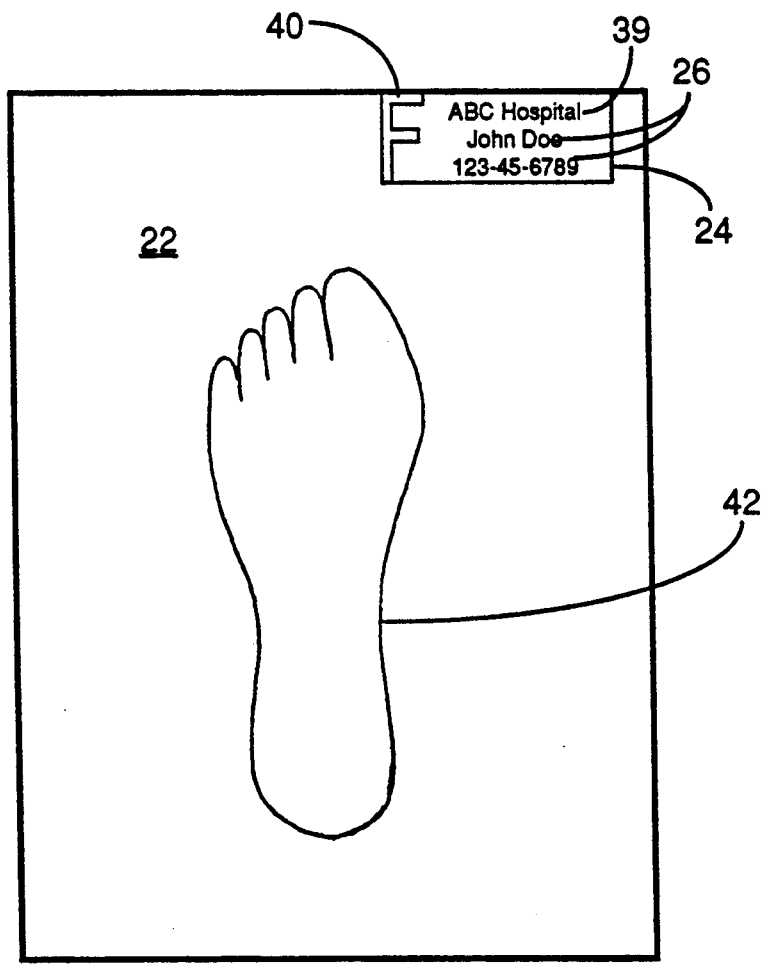
FIG. 2 is a schematic representation of a left foot viewed from the exposure side showing the film identification rectangle containing patient identification data and a chirally asymmetric marker.
Figure 3:
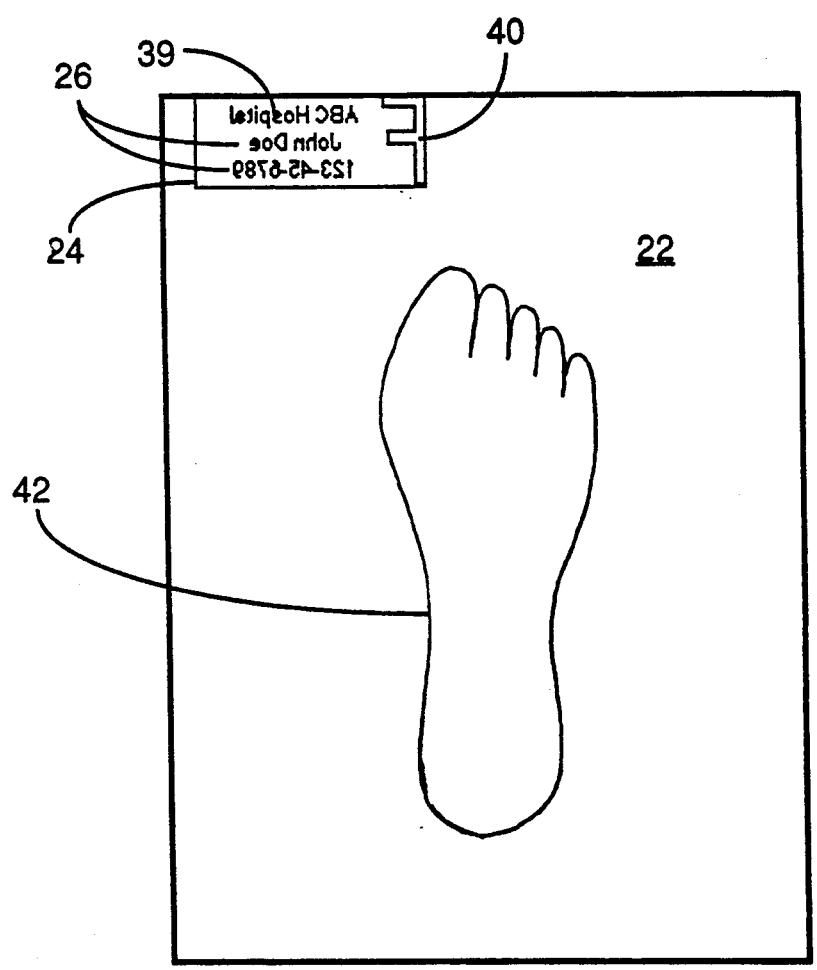
FIG. 3 is a schematic representation of a left foot viewed from the non-exposure side showing the film identification rectangle containing patient identification data and a chirally asymmetric marker.

There is depicted, in FIG. 2 of the drawings, a radiographic image 42 of a left foot viewed from the exposure side or front side of radiograph. The radiograph contains a rectangular area 24 within which appears patient identification data 26 and marker 40. Marker 40 indicates the front side of film 22. FIG. 3 illustrates the appearance of the same radiograph as depicted in FIG. 2 but viewed from the back or non-exposure side. Image 42 of the left foot now appears to be that of a right foot. However marker 40, which appears in identification rectangle 24, reads backwards alerting the viewer to the fact that he is looking at the back side of film 22 and that the image is actually that of a left foot.

Figure 4:
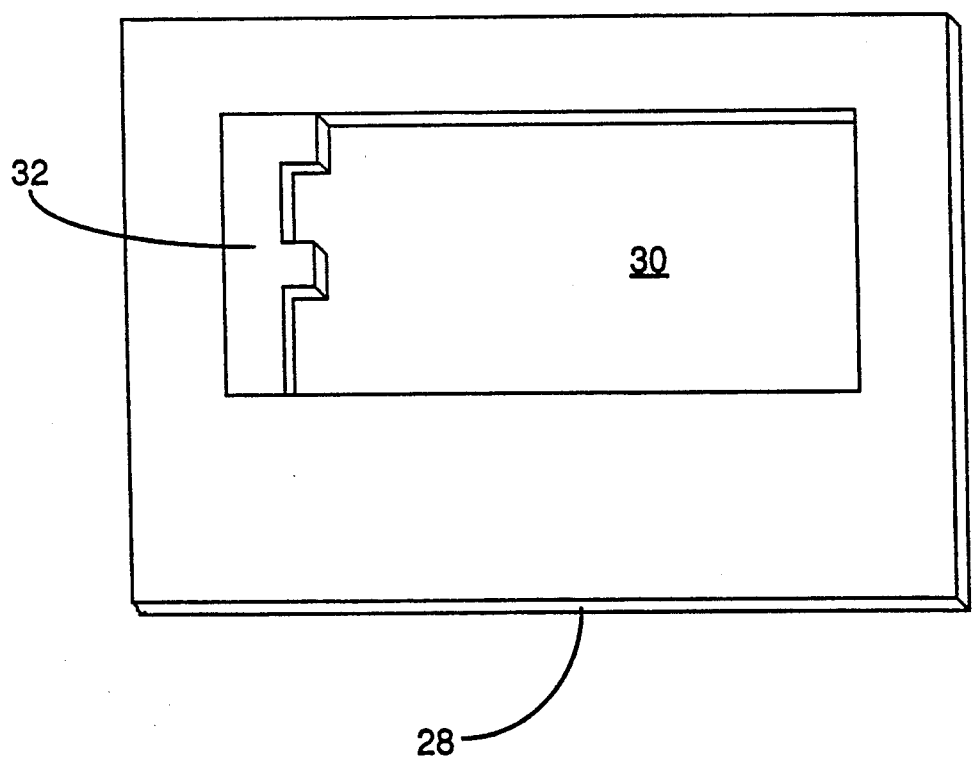
FIG. 4 is a schematic representation of an overlay having a transparent window within which is disposed a chirally asymmetric symbol.

FIG. 4 illustrates overlay 28, comprised of a thin sheet of metal, glass, plastic, composition or the like and containing a transparent window 30 within which symbol 32 is stationed along one margin of transparent window 30. Symbol 32 is comprised of a light absorbing material such as black ink or the like, and its image forms marker 40 on developed film sheet 22.

Figure 5:
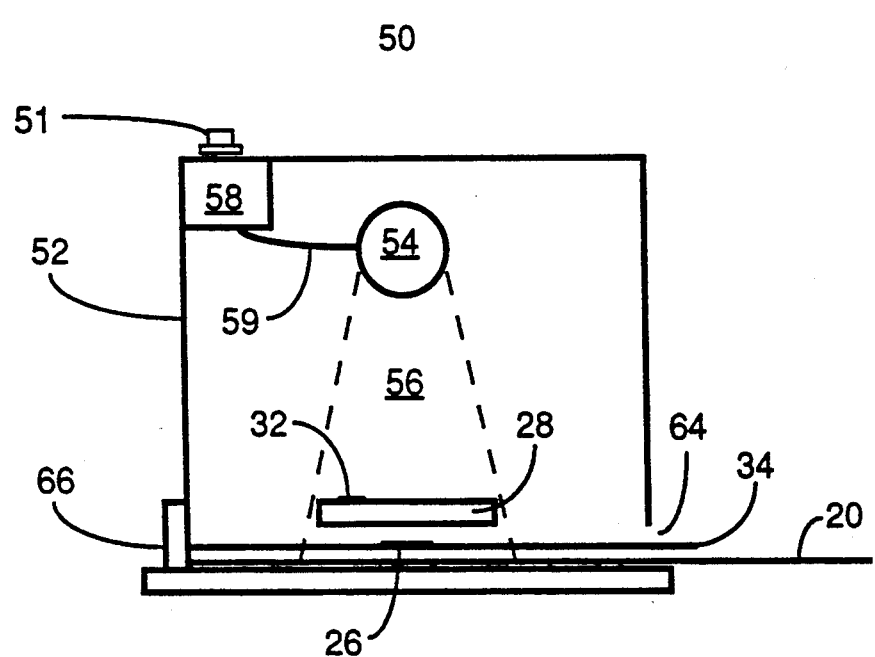
FIG. 5 is a schematic representation of a film identification printing apparatus which operates by transilluminating a patient data card and overlay.

FIG. 5 illustrates film identification apparatus 50 for projecting patient identification data 26 and symbol 32 onto identification rectangle 24 of undeveloped film 20. Overlay 28 is fixed within film identification apparatus 50 so that its window 30 is in register with the aperture of film identification apparatus 50. Film sheet 20 is inserted into apparatus 50 with its exposure side down. Overlay 28 is fixed in film identification apparatus 50 with an orientation such that symbol 32 reads backwards from the non-exposure or back side of the film sheet. This ensures that all films identified will bear a marker that reads correctly from the front or exposure side of the film sheet, irrespective of the orientation of card 34 or the type of illumination used. To develop the film, the cassette is brought into the dark room, placed with its front surface down on a horizontal work surface and opened from the back, by releasing the latch. Patient identification data 26 is entered on card 34, which in the dark room is also placed into film identification apparatus 50 against stop 66 bringing it in close proximity with the surface of undeveloped film 20, and patient data 26 in register with film identification rectangle 24 and the window in overlay 28. Light beam 56, from source 54, transilluminates both overlay 28 and card 34, simultaneously projecting symbol 32 and patient identification data 26 onto film identification rectangle 24 of undeveloped film 20 in the manner of a contact print, as shown in previous figures. Marker 40 is formed from the projected image of symbol 32. Card 34 may be preprinted with certain desirable data such as the name of the facility performing the examination and a border indicating the area of card 34 that will project onto film identification rectangle 34 that will project onto film identification rectangle 24, thereby serving as a guide for entering data on card 34. Variable switch 51 provides means for setting light intensity by regulating power from light controller 58 which supplies electrical current through cable 59 to light source 54.

In practice, the film sheet 20 is removed from its cassette and inserted into the film identification apparatus 50 until coming to rest against stop 66 with appointed identification rectangle 24 brought into alignment with window 30. If film sheet 20 is inadvertently placed incorrectly into film identification apparatus 50, the unexposed identification rectangle 24 is not brought into alignment with window 30 and card 34 containing patient data 26. Since rectangle 24 is normally the only area of the film which is predictably left unexposed by the x-ray beam, insertion of another corner of the film or turning the film upside down before inserting it would cause the data to be superimposed on an already exposed area of film sheet 20 and result in an illegible image of identification data 26 and no marker 40.

Figure 6:
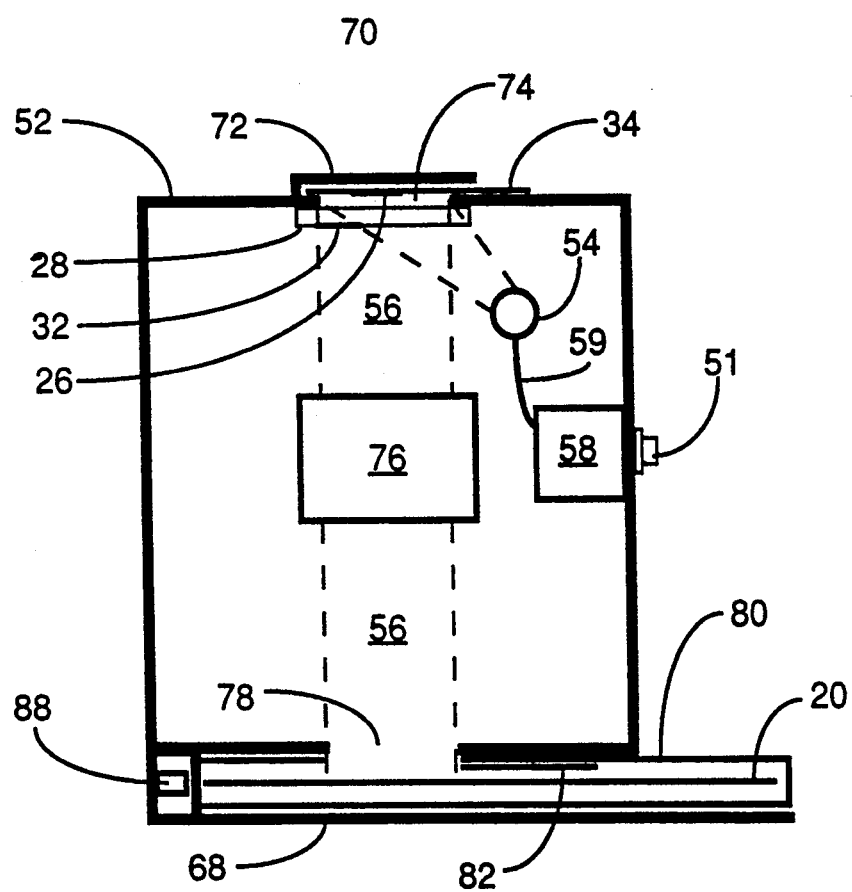
FIG. 6 is a schematic representation of a film identification apparatus which functions as a camera, utilizing an internal optical system to project patient identification data and a chirally asymmetric symbol onto the film sheet.

FIG. 6 depicts an alternative film identification apparatus 70. Card 34 containing patient identification data 26 is placed face-down under holder 72 over data entry aperture 74 containing overlay 28 in housing 52 of film identification apparatus 70. When undeveloped film 20 is ready for identification, cassette 80 in which undeveloped film 20 is contained, is firmly placed face-down into base 68 which action activates switch 88 opening sliding panel 82 in the back of cassette 80, uncovering film identification rectangle 24. Lens system 76 optically projects patient identification data 26 from card 34 and symbol 32 onto the back of undeveloped film 20. Marker 40 is formed from the projected image of symbol 32. Alternatively, overlay 28 is disposed within exit aperture 78. Symbol 32 intersects light beam 56 before it has reached film rectangle 24. As another alternative, overlay 28 is eliminated and card 34 bears on its face an imprint of light absorbing symbol 32 together with patient identification data 26. Variable switch 51 provides means for setting light intensity by regulating power from light controller 58 which supplies electrical current through cable 59 to light source 54.

Figure 7:
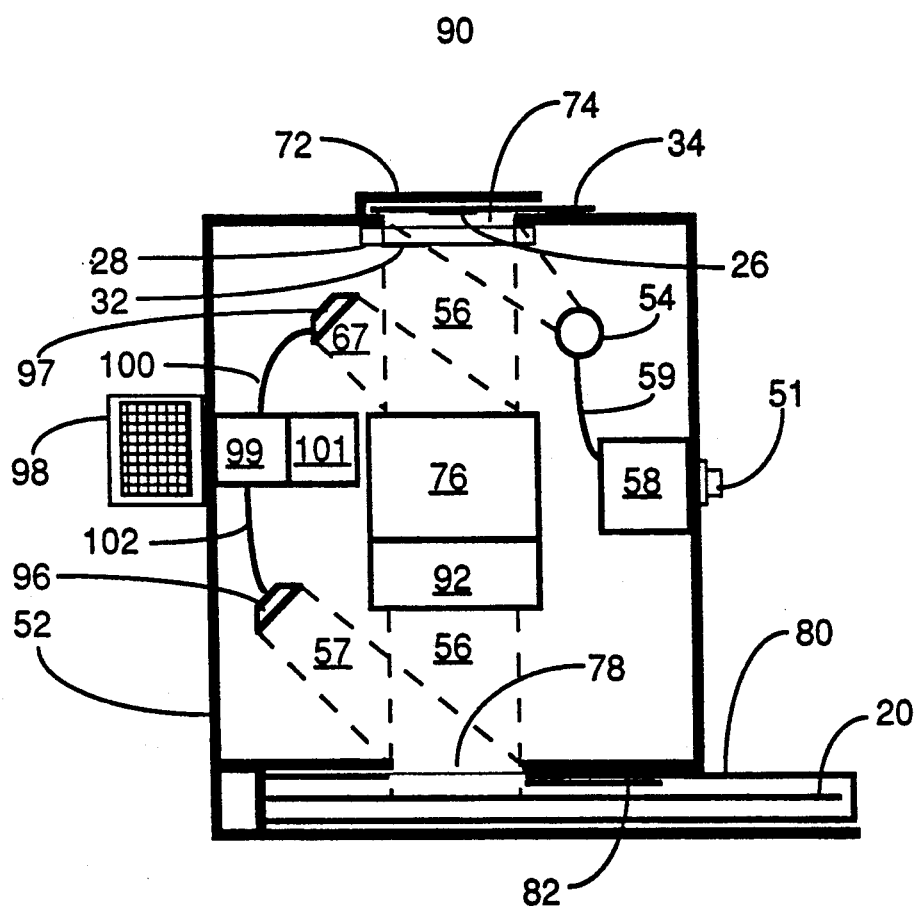
FIG. 7 is a schematic representation of a film identification apparatus adapted for digital generation of a chirally asymmetric symbol.

FIG. 7 depicts yet another alternative film identification apparatus 90. Card 34 containing patient identification data 26 is placed over aperture 74 in housing 52. Light source 54, illuminates face of card 34. Variable switch 51 provides means for setting light intensity by regulating power from light controller 58 which supplies electrical current through cable 59 to light source 54. Patient identification data 26 is projected by means of lens system 76 onto film rectangle 24. Symbol 32 generated internally by electronic symbol means 96 is projected onto film rectangle 24, forming marker 40. Preferably, film identification apparatus 90 also incorporates electronic digital means 97 for generating facility data 39 such as time, date, numerical sequence, hospital name, or the like, which may not appear on card 34. Electronic symbol means 96 and electronic digital means 97 are each comprised of a matrix of light emitting diodes. Electronic symbol means 96 projects symbol 32 via light beam 57. Electronic digital means 97 projects facility data 39 via light beam 67. Alternatively, electronic symbol means 96 and electronic digital means 97 are each comprised of a liquid crystal display having a back-light, such as found on calculators and laptop computers. Facility data 39 is entered on keyboard 98 which is electrically connected to display controller 99, which is in turn electrically connected to electronic digital means 97 by cable 100. Display controller 99 decodes facility data 39 from keyboard 98 and in turn encodes facility data 39 for electronic digital means 97. Display controller 99, also electrically connected to memory 101, encodes symbol 32 stored in memory 101 and transmits symbol 32 to electronic symbol means 96 via cable 102. Further, film identification apparatus 90 also incorporates reversing means 92, enabling the operator to reverse orientation of patient identification data 26 projected from card 34 and sequencing data projected from electronic digital means 97. A separate light path 57 provides the means to ensure that the image of symbol 32 reaches the film surface in a constant orientation unaffected by reversing means 92.

After the film bearing marker 40 is developed, an adhesive marker is optionally affixed to the front surface of the developed film by the technologist, guided by marker 40, making the "Front" designation even more prominent and readily visible. Preferably, the adhesive marker includes the date.

In practice, a radiograph of a body part is exposed, identified with patient data, and developed in the usual manner. Developed film will, by means of this invention, contain not only patient data but also a marker explicitly identifying the front of the film. The marker will read correctly only from the front of the film and thus indicate the front side, whereas the patient data may read in either direction depending on circumstances. The technologist may then optionally also affix an adhesive marker to the marker designated front of the film, making the front surface yet more readily identifiable, even when the film is lying on a table top and not illuminated from behind.

Having thus described the invention in rather full detail, it is understood that such detail need not be strictly adhered to but that various changes and modifications may suggest themselves to those skilled in the art, all falling within the scope of the invention as defined by the subjoining claims.

What is claimed is:

1. Apparatus for marking an undeveloped sheet of radiographic film, comprising:
   (a) projection means including a light source for generating a light path, said light source emitting light having a wavelength that ranges from $1 \times 10^{-7}$ meters to $1 \times 10^{-6}$ meters included therewithin;
   (b) mean for controlling the time and intensity of light reaching said sheet of radiographic film;
   (c) means defining a recess for receiving said film sheet;
   (d) a card bearing patient identification data;
   (e) means for positioning a chirally asymmetric symbol in said light path between said card and said sheet of radiographic film;
   (f) means for defining a recess for receiving said card; and
   (g) projection means for projecting said patient identification data and said symbol onto said undeveloped sheet of radiographic film,
   whereby said light source illuminates said card and said projection means projects each of said chirally asymmetric symbol and said patient identification data onto said film sheet to form thereon said marker and said patient identification data that become permanently recorded upon development of said film.

2. Apparatus, as recited in claim 1, further comprising means for focusing said patient identification data and said marker onto said radiographic film.

3. Apparatus as recited in claim 1, further comprising an entry aperture and an exit aperture.

4. Apparatus as recited in claim 3, wherein said symbol is positioned proximate the plane of said entry aperture and in said light path between said light source and said film sheet.

5. Apparatus as recited in claim 4, wherein said symbol is positioned proximate of the plane of said exit aperture and in said light path between said light source and said film sheet.

6. Apparatus for marking an undeveloped sheet of radiographic film, comprising:
    (a) projection means including a light source for generating a light path, said light source emitting light having a wavelength that ranges from $1 \times 10^{-7}$ meters to $1 \times 10^{-6}$ meters included therewithin;
    (b) means for controlling the time and intensity of light reaching said sheet of radiographic film;
    (c) means defining a recess for receiving said film sheet;
    (d) an overlay comprised of a sheet of rigid material, said overlay containing a transparent or open window having a chirally asymmetric symbol disposed therewithin and being positioned in the light path between the light source and the film sheet;
    (e) a card, positioned in said path between said light source and said film sheet, said card bearing patient identification data; and
    (f) means for defining a recess for receiving said card, whereby said projection means projects each of said chirally asymmetric symbol and said patient identification data onto said film sheet to form thereon a marker and said patient identification data that become permanently recorded upon development of said film.

7. Apparatus as recited in claim 6, wherein said projection means further comprises means for focusing said patient identification data and said marker onto said radiographic film.

8. Apparatus as recited in claim 6 wherein said overlay is disposed proximate the plane of said film sheet.

9. Apparatus as recited in claim 6 wherein said overlay is comprised of a sheet of rigid material selected from the group consisting of metal, plastic, glass, and cardboard.

10. Apparatus for marking an undeveloped sheet of radiographic film, comprising:
    (a) projection means including a light source for generating a light path, said light source emitting light having a wavelength that ranges from $1 \times 10^{31\ 7}$ meters to $1 \times 10^{-6}$ meters included therewithin;
    (b) means for controlling the time and intensity of light reaching said film sheet;
    (c) means defining a recess for receiving said film sheet;
    (d) a card, positioned in the light path between the light source and the film sheet, said card bearing patient identification data and a chirally asymmetric symbol; and
    (e) means defining a recess for receiving said card, whereby said projection means projects each of said chirally asymmetric symbol and said patient identification data onto said film sheet to form thereon a marker and said patient identification data that become permanently recorded upon development of said film.

11. Apparatus as recited in claim 10, including means for positioning said symbol proximate the plane of said card.

12. Apparatus to project a chirally asymmetric marker onto an undeveloped sheet of radiographic film, comprising:
    (a) projection means including a light source for generating a light path, said light source emitting light having a wavelength that ranges from $1 \times 10^{31\ 7}$ meters to $1 \times 10^{-6}$ meters included therewithin;
    (b) means for controlling the time and intensity of light reaching said film sheet;
    (c) means defining a recess for receiving said film sheet;
    (d) a card bearing patient identification data, and a chirally asymmetric symbol; and
    (e) means defining a recess for receiving said card;
    said light source being operative to illuminate said card and said projection means being operative to project each of said chirally asymmetric symbol and said patient identification data onto said film sheet to form thereon a marker and said patient identification data that become permanently recorded upon development of said film.

13. Apparatus for marking an undeveloped sheet of radiographic film, comprising:
    (a) a chirally asymmetric symbol comprising light emitting diodes;
    (b) means for electronically generating said symbol; and
    (c) means defining a recess for receiving said sheet of radiographic film,
    whereby said chirally asymmetric symbol is projected onto said film sheet to form thereon a marker that becomes permanently recorded upon development of said film sheet.

14. Apparatus, as recited in claim 13, further comprising a means to electronically generate patient information data.

15. Apparatus for marking an undeveloped sheet of radiographic film, comprising:
    (a) projection means including a light source for generating a light path, said light source emitting light having a wavelength that ranges from $1 \times 10^{31\ 7}$ meters to $1 \times 10^{-6}$ meters included therewithin;
    (b) a liquid crystal display adapted to form a chirally asymmetric symbol, said display being positioned between said light source and said film sheet;
    (c) means for electronically actuating said display to generate said symbol; and
    (d) a recess for receiving said sheet of radiographic film;
    whereby said symbol is projected onto said film sheet to form thereon a marker that becomes permanently recorded upon development of said film sheet.

16. Apparatus as recited in claim 15, wherein said display further comprises means for electronically generating patient information data.

17. Apparatus as recited in claim 16, further comprising means for reversing the orientation of said patient identification data.

* * * * *